US010936885B2

(12) United States Patent
Ueno (10) Patent No.: US 10,936,885 B2
(45) Date of Patent: Mar. 2, 2021

(54) SYSTEMS AND METHODS OF PROCESSING AN IMAGE

(71) Applicant: Toyota Research Institute, Inc., Los Altos, CA (US)

(72) Inventor: Junya Ueno, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 0 days.

(21) Appl. No.: 15/929,015

(22) Filed: May 15, 2018

(65) Prior Publication Data

US 2019/0354780 A1    Nov. 21, 2019

(51) Int. Cl.
| | |
|---|---|
| *G06K 9/00* | (2006.01) |
| *G06T 5/00* | (2006.01) |
| *H04N 5/225* | (2006.01) |
| *G02B 27/00* | (2006.01) |

(52) U.S. Cl.
CPC ..... *G06K 9/00805* (2013.01); *G02B 27/0037* (2013.01); *G06T 5/002* (2013.01); *H04N 5/2254* (2013.01)

(58) Field of Classification Search
CPC ............ G06K 9/00805; G02B 27/0037; G06T 5/002; H04N 5/2254
USPC ........................................................ 348/148
See application file for complete search history.

(56) References Cited

U.S. PATENT DOCUMENTS

| | | | |
|---|---|---|---|
| 8,218,895 B1 | 7/2012 | Gleicher et al. | |
| 8,233,045 B2 | 7/2012 | Luo et al. | |
| 8,391,640 B1 | 3/2013 | Jin | |
| 8,396,251 B2 | 3/2013 | Mirbach et al. | |
| 8,427,538 B2 | 4/2013 | Ahiska | |
| 8,629,930 B2 | 1/2014 | Brueckner et al. | |
| 8,917,336 B2 | 12/2014 | Cote et al. | |
| 2007/0091196 A1* | 4/2007 | Miyanohara | G02B 13/08 348/335 |
| 2010/0002070 A1 | 1/2010 | Ahiska | |
| 2016/0300334 A1 | 10/2016 | Chen | |
| 2018/0307040 A1* | 10/2018 | Miyazawa | G02B 27/0037 |

OTHER PUBLICATIONS

Hughes Ciaran et al., "Review of geometric distortion compensation in fish-eye cameras." ISSC 2008, Galway, Jun. 18-19, pp. 162-167.

(Continued)

*Primary Examiner* — On S Mung
(74) *Attorney, Agent, or Firm* — Christopher G. Darrow; Darrow Mustafa PC (57) ABSTRACT

Systems, methods, and other embodiments described herein relate to processing an image having a distortion and an object. The method according to some embodiments includes acquiring an image having a distortion and performing a first object detection analysis on a first portion of the image. Next, the method includes performing an undistortion process on the image, and after, performing a second object detection analysis on a second portion of the image. The second portion of the image is different than the first portion of the image. The method can then combine a first result of the first object detection analysis with a second result of the second object detection analysis.

21 Claims, 7 Drawing Sheets

(56) References Cited

OTHER PUBLICATIONS

Hughes C. et al., "Wide-Angle Camera Technology for Automotive Applications—A Review", IET Intelligent Transport Systems, Mar. 1, 2009 in 33 pages.
"Radial Lens Distortion Correction with Sub-Pixel Accuracy for X-Ray Micro-Tomography", Optics Express 32859, Dec. 14, 2015, vol. 23, No. 2, DOI:10.1364/OE.23.032859 in 10 pages.

\* cited by examiner

SYSTEMS AND METHODS OF PROCESSING AN IMAGE

TECHNICAL FIELD

The subject matter described herein relates generally to systems and methods of processing an image and, more specifically, performing object detection analyses on an image that has a distortion.

BACKGROUND

Conventionally, object detection is executed using an undistorted image. However if a lens produces strong visual distortion, many pixels are lost after the image has been subjected to the undistortion process. The more distortion a lens has, the more pixel information is lost after the process. This is particularly the case around the optical axis. Further, applying object detection around an area which has large distortion does not work in most cases because the shape of the object is deformed.

SUMMARY

In embodiments, a first object detection analysis is performed before the image has been subjected to the undistortion process and a second object detection analysis is performed after the image has been subjected to the undistortion process. The results of the first object detection analysis and the second object detection analysis are combined. In further embodiments, the first object detection analysis is performed on a first portion of the image before the undistortion process and the second object detection analysis is performed on a second portion of the image after the undistortion process. The second portion of the image is different than the first portion of the image. Richer pixel information can be utilized in the combined object detection analyses as compared to only using an analysis on the undistorted image.

In one embodiment, a method of processing an image is disclosed. The method includes acquiring an image having a distortion and performing a first object detection analysis on a first portion of the image. Next, the method includes performing an undistortion process on the image, and after, performing a second object detection analysis on a second portion of the image. The second portion of the image is different than the first portion of the image. The method then combines a first result of the first object detection analysis with a second result of the second object detection analysis.

In another embodiment, an imaging system for processing an image captured with a camera is disclosed. The imaging system includes a processor, and a memory communicably coupled to the processor. The memory stores an object detecting module and a distortion correcting module. The object detecting module includes instructions that when executed by the processor cause the processor to perform object detecting on a first portion of the image and perform object detecting on a second portion of the image. The first portion of the image and the second portion of the image are different. The distortion correcting module includes instructions that when executed by the processor cause the processor to perform an undistortion process on the image. The undistortion process occurs after object detecting on the first portion of the image and before object detecting on the second portion of the image.

In yet another embodiment, a non-transitory computer-readable medium for processing an image is disclosed. The non-transitory computer-readable medium stores instructions that when executed by a processor cause the processor to acquire an image having a distortion, perform a first object detection analysis on a first portion of the image, perform an undistortion process on the image, perform a second object detection analysis on a second portion of the image, and combine a first result of the first object detection analysis with a second result of the second object detection analysis.

DETAILED DESCRIPTION

Systems, methods, and other embodiments for processing an image are disclosed herein. The image can be an image acquired in a vehicular and/or robotic application. As one example, described arrangements can be implemented on a vehicle and used for acquiring an image for object detection. The vehicle can then perform a vehicular action (e.g., provide a warning, operate an aspect of the vehicle) based, at least, on the detection of the object. The vehicle can control one or more vehicle actuators to implement a determined travel path.

As another example, the described arrangements can be implemented on a robot. The robot can determine one or more maneuvers based on the object. The maneuvers can include, for instance, handling the object, avoiding the object, etc. The robot can then control one or more robotic actuators to implement the determined maneuvers.

While the detailed arrangements discussed below are described in connection with a vehicle, one skilled in the art can apply the invention to robotic apparatus. Moreover, the described arrangements can be used in other imaging systems (e.g., of a smart device) and/or advanced control apparatus for controlling actuators.

In embodiments, a first object detection analysis can be performed before an image has been subjected to an undistortion process and a second object detection analysis can be performed after the image has been subjected to the undistortion process. The results of the first object detection analysis and the second object detection analysis are combined. Richer pixel information can be utilized in the combined object detection analyses as compared to only using an analysis on the undistorted image. More specifically, rather than performing object detection after the image has been corrected (i.e., undistorted) and lose pixel information from the original image, embodiments execute the first object detection analysis around the optical axis before undistortion. Subsequently, a second object detection analysis is performed again after distortion, but only on the areas of the undistorted image that are newly revealed areas. The results from both analyses are then combined.

Additionally, computational cost can be decreased in some embodiments. As discussed above, object detection may not be executed on the whole image both before and after the undistortion process. Rather, in some embodiments a portion or area that the first object detection analysis is performed on can be removed from the undistortion process because object detection has already been executed in this area. Accordingly, there is no need to repeat the object detection process on the removed portion of the undistorted image. As such, the computational cost can be decreased.

Figure 1:
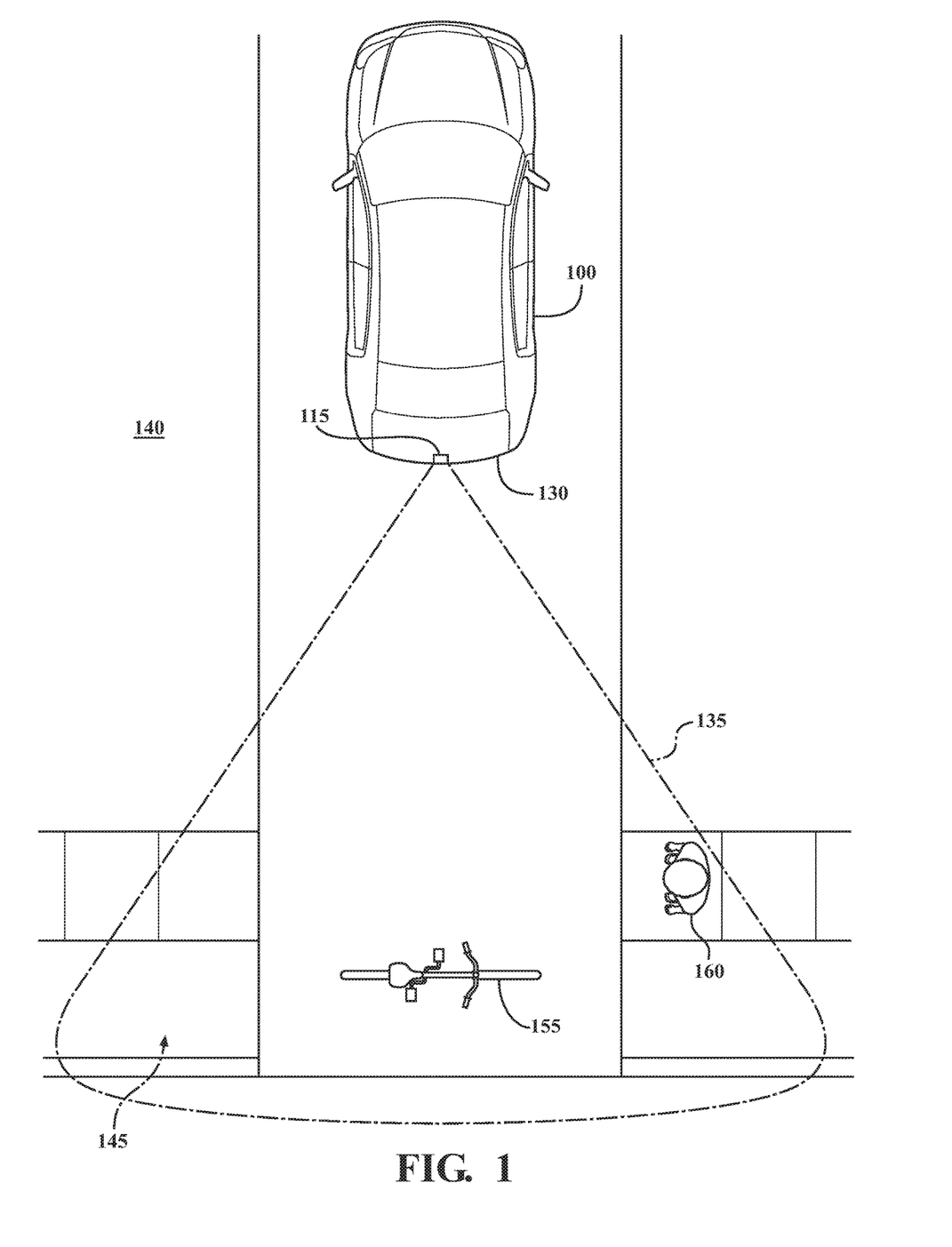
FIG. 1 shows a top view of a vehicle capturing an image of a portion of an environment.
Figure 2:
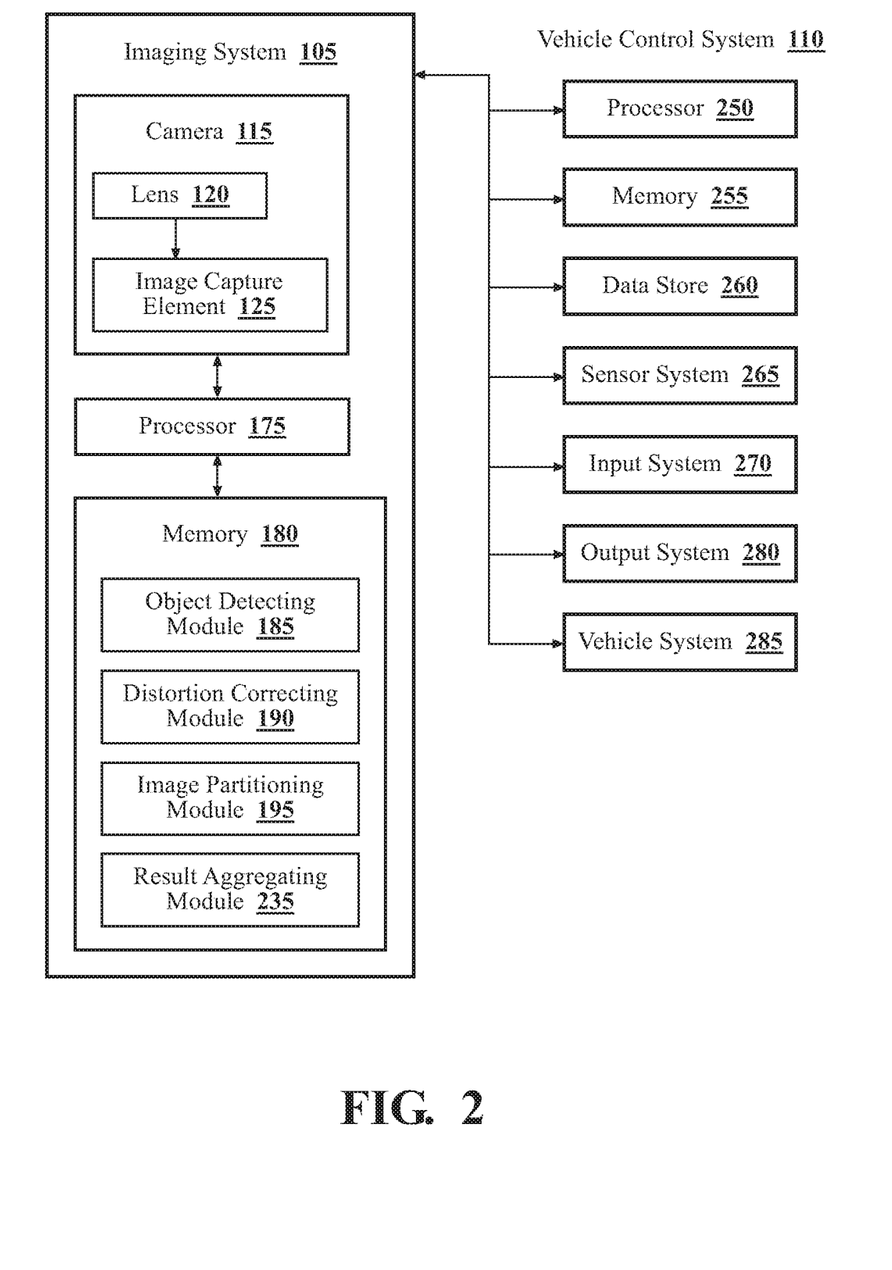
FIG. 2 shows a block diagram of portions of a vehicle control system, including an imaging system, used in the vehicle of FIG. 1.

FIG. 1 shows a top view of a vehicle 100 incorporating an imaging system. FIG. 2 schematically shows an arrangement for portion of an imaging system 105 that can be used in the vehicle 100 of FIG. 1. FIG. 2 also shows portions of a vehicle control system 110 that can be used in the vehicle 100. With reference to FIG. 1 and FIG. 2, the vehicle 100 includes a camera 115. The camera 115 can include a lens 120 and an image capture element 125. The image capture element 125 can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture element 125 may capture images in any suitable wavelength on the electromagnetic spectrum. The image capture element 125 may capture color images and/or grayscale images.

The camera 115 is operatively connected to the outwardly facing surface 130 of the vehicle 100. Operatively connected can include direct or indirect connections, including connections without direct physical contact. Accordingly, the camera 115 can be directly or indirectly connected to the outwardly facing surface 130 of the vehicle 100. The vehicle 100 discussed herein has a single camera. However, it is envisioned that the vehicle 100 can include many cameras operatively connected to a surface, including inwardly and/or outwardly facing surfaces. For simplicity, the discussion herein will focus only on the single camera.

The camera 115 has a field of view 135 extending radially from the outwardly facing lens 120. The field of view 135 is a portion of the environment 140 within which the camera 115 can detect electromagnetic radiation via the lens 120 and image capture element 125.

The camera 115 is configured to capture images. An image is a digital representation of a scene 145 for the environment 140 as captured by the camera 115. The scene 145 is the portion of the environment 140 observed through the field of view 135. The image 150 (FIG. 3) captured by the camera 115 corresponds to the field of view 135 of the camera 115.

Figure 3:
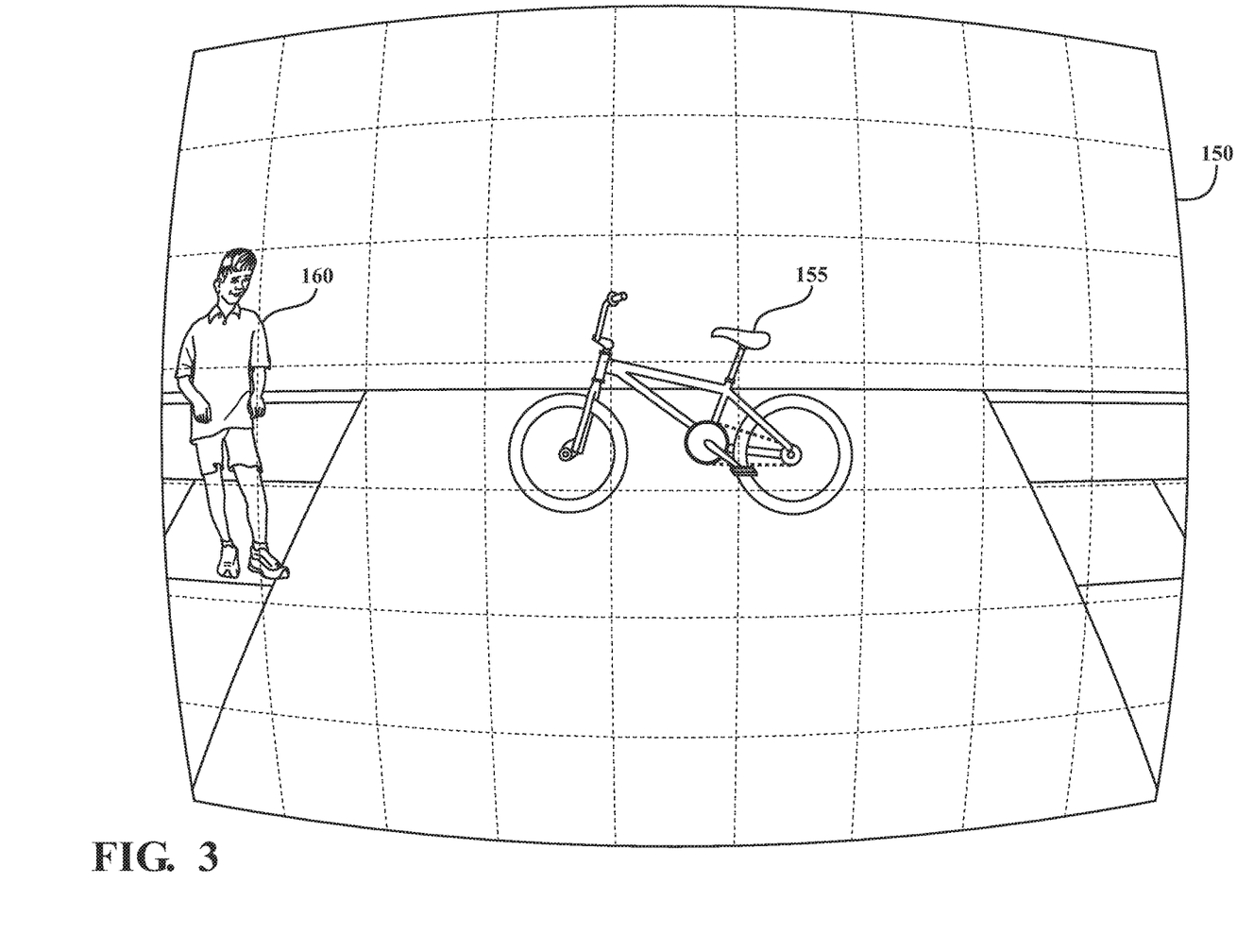
FIG. 3 shows an example of a distorted image.
Figure 4:
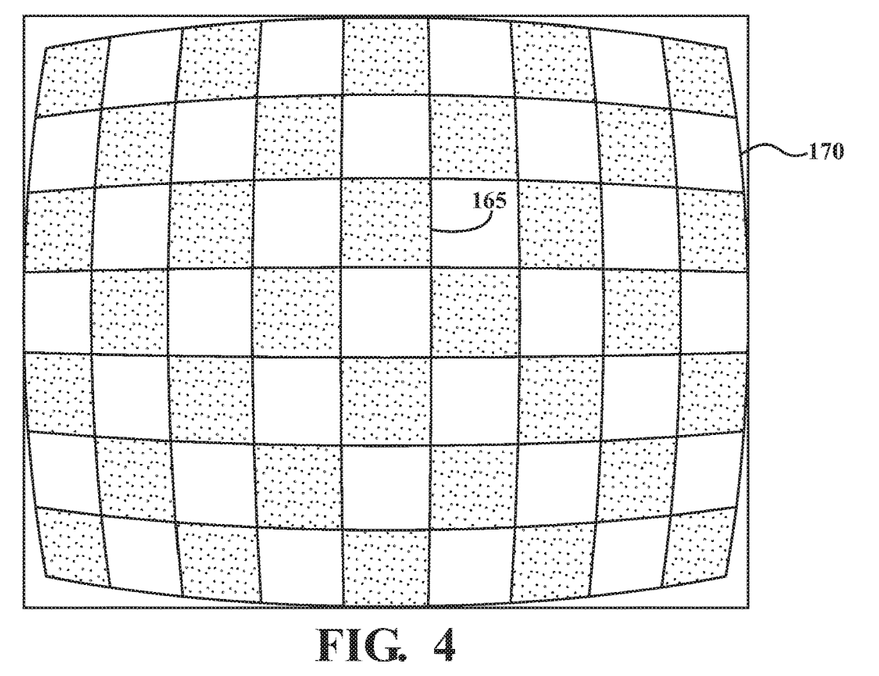
FIG. 4 shows a schematic of a distorted image.

The image 150 shown in FIG. 3 is an image captured with a camera having a lens that is typically referred to as a "fisheye" lens. The image 150 includes a first object 155 (which is a bicycle) and a second object 160 (which is a child or pedestrian). The fisheye lens is an ultra-wide-angle lens that produces a strong visual distortion. The distortion is intended to create a wide panoramic or hemispherical image, thereby achieving an extremely wide angle of view. The image 150 in FIG. 3 includes a quadrilateral grid 165 superimposed on top of the image 150. The schematic image in FIG. 4 shows the quadrilateral grid 165 of FIG. 3. To better schematically represent the image, a checker-board effect is added to the quadrilateral grid 165 of FIG. 4. The resultant schematic 170 corresponds to the image 150 in FIG. 3.

Imaging can have may types of distortion. Distortion can be irregular or follow many patterns. The most common encountered distortions are approximately radially symmetric arising from a symmetry axis of the photographic lens. Example radial distortions include "barrel" distortions, "pincushion" distortions, and "complex" distortions. In barrel distortions, image magnification decreases with distance from the optical axis. The apparent effect is that of an image which has been mapped around a sphere or barrel. In pincushion distortions, image magnification increases with a distance from the optical axis. The visible effect is that lines that do not go through the center of the image are bowed inwards towards the center of the image like a pincushion. A mixture of a barrel distortion and a pincushion distortion is sometimes referred to as a complex distortion. One example of a complex distortion is the "mustache" distortion. The mustache distortion starts out as a barrel distortion close to the image center and gradually turns into a pincushion distortion towards the image periphery. For ease of explanation, embodiments discussed herein will focus on a barrel distortion (shown in FIGS. 3 and 4) caused by a fisheye lens. However, the processes and modules discussed herein can be utilized with other distortion types, such as the pincushion distortion or the complex distortion.

Referring back to FIG. 2, the imaging system 105 has a processor 175 and a memory 180. While the arrangement of FIG. 2 shows a single processor and a single memory, it is envisioned that many other arrangements are possible. For example, it is envisioned that the processor 175 and memory 180, and their related functionality, can be implemented by the vehicle control system 110 (e.g., as part of the processor and memory, discussed below, of the vehicle control system 110). As another example, it is envisioned that the functions discussed below for the processor 175 and memory 180 can be split among the processor 175 and memory 180 and the processor and memory, discussed below, of the vehicle control system 110. Even further arrangements can be envisioned by one skilled in the art now and in the future.

The processor 175 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 175 can include a hardware circuit (e.g., an integrated circuit) configured to carry out instructions contained in program code. In arrangements in which there are a plurality of processors, such processors can work independently from each other or one or more processors can work in combination with each other.

The imaging system 105 includes the memory 180 for storing one or more types of data and instructions. The memory can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 180 can be a component of the processor 175, or the memory 180 can be operatively connected to the processor 175 for use thereby. The memory 180 can be located remotely from the imaging system 105 and be accessible by the imaging system 105, such as via a communications device or data bus.

In one or more arrangements, the memory 180 can include various instructions stored thereon. For example, the memory 180 can store one or more modules. Modules can be or include computer-readable instructions that, when executed by the processor 175, cause the processor 175 to perform the various functions disclosed herein. While functions may be described herein for purposes of brevity, it is noted that the functions are performed by the processor 175 using the instructions stored on or included in the various module described herein. Some modules may be stored remotely and accessible by the processor 175 using, for instance, various communication devices and protocols.

The memory 180 can store an object detecting module 185. The object detecting module 185 includes instructions that function to control the processor 175 to detect an object in an image and/or a portion of an image. The object detecting module 185 can include any known technique in the field of computer vision for finding and/or identifying one or more objects in an image. The image may be part of a video sequence, which includes a plurality of images. Example techniques for object detection include approaches based on computer-aided design (CAD) object model methods, appearance-based methods, feature-based methods, and genetic algorithm methods.

The memory 180 can also store a distortion correcting module 190. The distortion correcting module 190 includes instructions that function to control the processor 175 to correct a distortion in the image and/or a portion of the image. The distortion correcting module 190 can include any known technique in the field of computer vision for undistorting the image. An example technique for correcting a radial distortion is a technique incorporating a Brown's distortion model, also known as the Brown-Conrady model. The model corrects radial distortion, such as the barrel effect, caused by physical elements in a lens, such as a fisheye lens.

Figure 6:
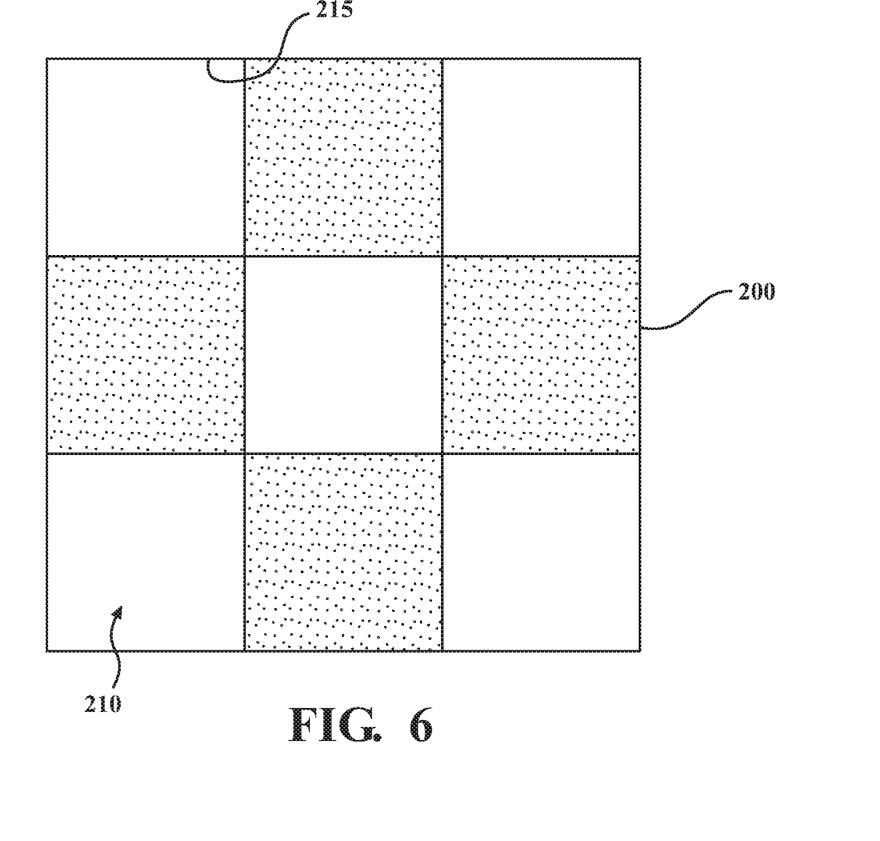
FIG. 6 shows a partial schematic of a distorted image.
Figure 7:
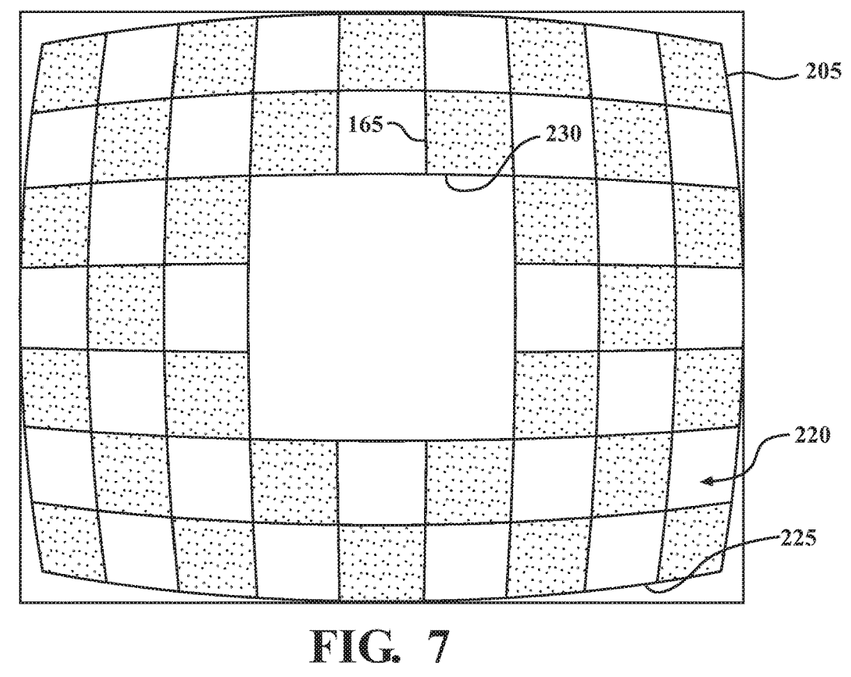
FIG. 7 shows a second partial schematic of a distorted image.

The memory 180 can further store an image partitioning module 195. The image partitioning module 195 includes instructions that function to control the processor 175 to partition an image into a plurality of image portions (also referred to as image areas). For example, FIG. 6 and FIG. 7 schematically represents FIG. 3, and more specifically FIG. 4, partitioned in a first image portion 200 and a second image portion 205. A first area 210 of the first image portion 200 is determined by a first perimeter 215 (also referred to as boundary, FIG. 4). A second area 220 (FIG. 7) of the second image portion 205 is determined in part by the exterior 225 of the image 150. In some implementations, the second area 220 of the second image portion 205 is determined in part by the second perimeter 230. In the embodiment shown, the second perimeter 230 is the same as the first perimeter 215. However, the second perimeter 230 and the first perimeter 215 may be different such that the first area 210 overlaps with the second area 220. It is also envisioned that the second area 220 may not have a second perimeter at all. Further discussion regarding the perimeters and areas is provided below.

The memory 180 can also store a result aggregating module 235. The result aggregating module 235 includes instructions that function to control the processor 175 to aggregate the results of the object detection module 185. For example, the result aggregating module 235 can be implemented as a table that aggregates a first result of a first image portion analysis with a second result of a second image portion analysis. The aggregation can occur while the processor 175 is performing object detection.

Referring back to FIG. 2, the vehicle control system 110 will now be discussed in detail as an example vehicle control system. In one or more implementations, the vehicle 100 is highly automated or completely automated. In one implementation, the vehicle 100 is configured with one or more semi-autonomous operational modes in which one or more computing systems perform a portion of the navigation and/or maneuvering of the vehicle 100, and a vehicle operator (i.e., driver) provides inputs to the vehicle 100 to perform a portion of the navigation and/or maneuvering of the vehicle 100. Thus, in one or more implementations, the vehicle 100 operates autonomously according to a particular defined level of autonomy.

The vehicle control system 110 can include a processor 250 and a memory 255. In one or more arrangements, the processor 250 and the memory 255 can be a main processor and memory of the vehicle 100. For instance, the processor 250 can be an electronic control unit (ECU). Similar to the processor 175 and the memory 180 discussed earlier, the processor 250 and the memory 255 are shown as a single processor and memory. However, it is envisioned that many other arrangements are possible similar to what was discussed for the processor 175 and memory 180.

The vehicle 100 can include a data store 260 for storing one or more types of data. The data store 260 can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 260 can be a component of the processor 250 or the memory 255, or the data store 260 can be operably connected to the processor 250 for use thereby.

The data store 260 can include sensor data. In this context, sensor data means any information about the sensors that the vehicle 100 is equipped with, including the capabilities and other information about such sensors. The vehicle 100 can include a sensor system 215. The sensor data can relate to one or more sensors of the sensor system 215. While shown separate, the imaging system 105 is a specific example of a sensor system, and intermediate and resultant data can be stored in the data store 260.

In some instances, at least a portion of the sensor data can be located in one or more data stores located onboard the vehicle 100. Alternatively, or in addition, at least a portion of the sensor data can be located in one or more data stores that are located remotely from the vehicle 100.

As noted above, the vehicle 100 can include the sensor system 265. The sensor system 265 can include a sensor. A sensor is a device, component, and/or system that can detect and/or sense something. The one or more sensors can be configured to detect and/or sense in real-time. As used herein, real-time means a level of processing responsiveness that a user or system senses as sufficiently immediate for a particular process or determination to be made, or that enables the processor to keep up with some external process.

In arrangements in which the sensor system 265 includes a plurality of sensors, the sensors can function independently from each other. Alternatively, two or more of the sensors can work in combination with each other. In such a case, the two or more sensors can form a sensor network. The sensor system 265 and/or the one or more sensors can be operably connected to the processor 250, the data store 260, and/or another element of the vehicle 100. The sensor system 265 can acquire data of at least a portion of the external environment of the vehicle 100 (e.g., nearby vehicles).

Various examples of different types of sensors include one or more vehicle sensors and one or more environment sensors. The vehicle sensor(s) can detect, determine, and/or sense information about the vehicle 100 itself. The environment sensor(s) can detect, determine, and/or sense information about the driving environment data. Driving environment data includes data or information about the external environment in which a vehicle is located or one or more portions thereof. For example, one environment system can be the imaging system 105 and one environment sensor can include the camera arrangement for detecting, quantifing, and/or sensing obstacles in at least a portion of the environment 140 of the vehicle 100. Such obstacles may be stationary objects and/or dynamic objects. Other environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

The vehicle 100 can include an input system 270. The input system 270 includes any device, component, system, element or arrangement or groups thereof that enable information/data to be entered into a machine. The input system 270 can receive an input from a vehicle occupant (e.g. a driver). The vehicle 100 can include an output system 280. An output system 280 includes any device, component, or arrangement or groups thereof that enable information/data to be presented to a vehicle passenger (e.g. a driver).

The vehicle 100 can include one or more vehicle systems 285. The vehicle systems 285 can include a propulsion system, a braking system, a steering system, a throttle system, a transmission system, a signaling system, and/or a navigation system. Each of these systems can include one or more devices, components, and/or combination thereof, now known or later developed. The processor 250 and the imaging system 105, among other systems, can be operably connected to communicate with the one or more vehicle systems 285 and/or individual components thereof. For example, the processor 250 can be in communication with, and send and/or receive information to vehicle systems 285 for controlling the movement, speed, maneuvering, heading, direction, warning, etc. of the vehicle 100 based on the results provided by the imaging system 105.

For instance, the processor 250, based on information from the imaging system 105, may cause a vehicle system 285 to control the direction and/or speed of the vehicle 100. The processor 250 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). Cause or causing means to make, force, compel, direct, command, instruct, and/or enable an event or action to occur or at least be in a state where such event or action may occur, either in a direct or indirect manner.

Figure 9:
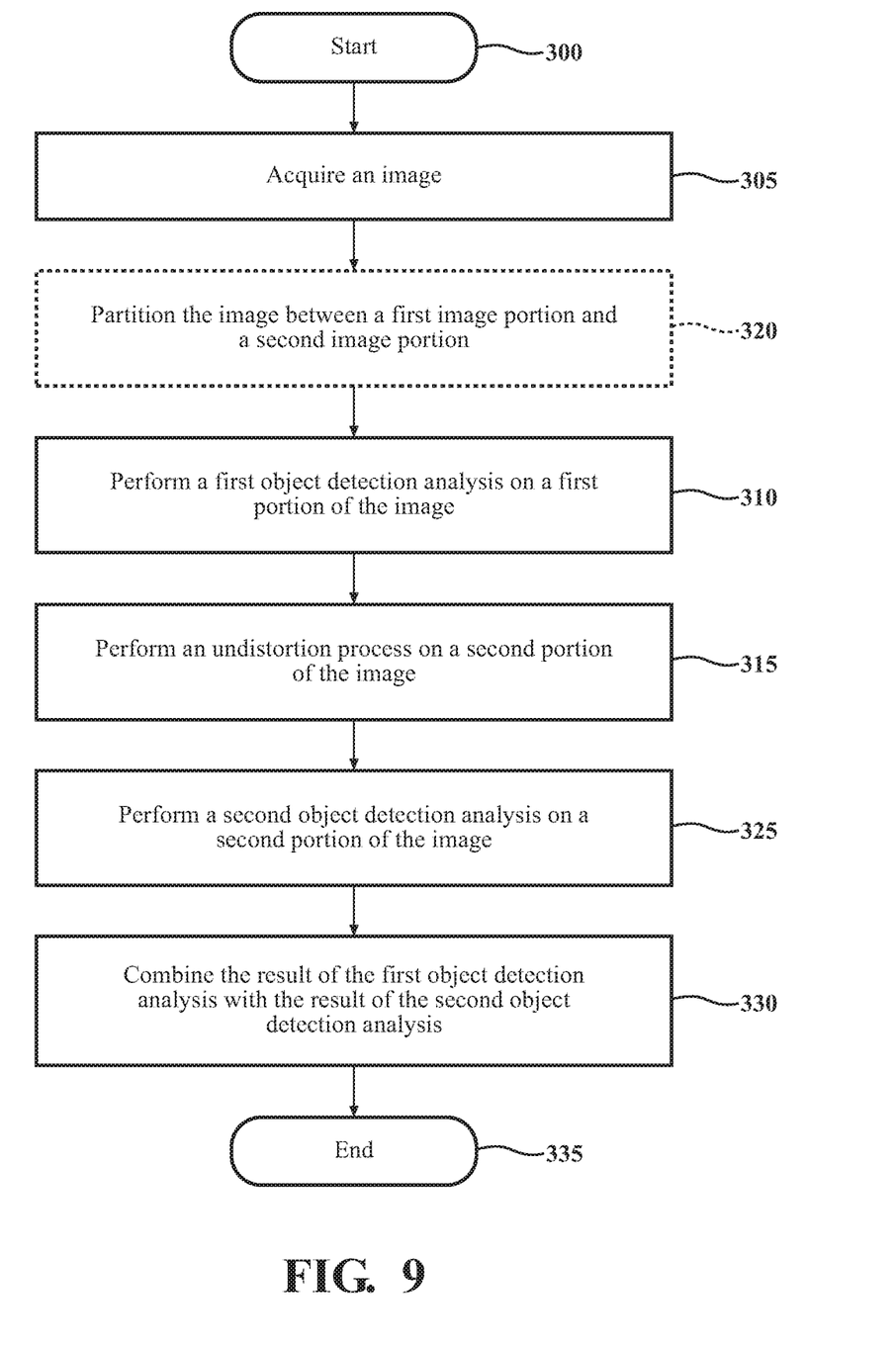
FIG. 9 is a flowchart depicting an example method of processing the image of FIG. 3.

Now that various aspects of the vehicle 100 have been described, a method of processing an image, particularly for the vehicle 100, will be described with reference to FIG. 9. The flowchart shown in FIG. 9 provides only one example of processing an image. The following disclosure should not be limited to each and every function block shown in FIG. 9. To the contrary, the method does not require each and every function block shown. In some examples, the method may include additional function blocks. Further, the method does not need to be performed in the same chronological order shown in FIG. 9.

It is also envisioned that while the method of FIG. 9 is described in connection with the vehicle 100, the method can be used in other apparatus, including robotic apparatus, smart devices, computers, security systems, photography cameras, video cameras, etc. Moreover, while the method is described in connection with a single image, the method can be applied to video, which includes a plurality of images.

The method of FIG. 9 begins at starting block 300. At block 305, the imaging system 105 acquires an image 150. For example, the camera 115 can be operatively connected on a surface 130 of the vehicle 100. The disclosed image 150 is a partial image of the environment 140 and shows two objects. The first object 155 is a bike and the second object 160 is a child. The image 150 (shown in FIG. 3) is captured with a camera 115 having a fisheye lens. The image 150 has a significant barrel effect resulting from the fisheye lens. The first object 155 is located approximately near the image axis for the lens 120, and the second object 160 is located near a periphery of the image 150. For ease of description, a quadrilateral grid 165 is superimposed on top of the image 150. FIG. 4 schematically shows the quadrilateral grid 165 of FIG. 3.

At block 310, a first object detection analysis is performed on a first portion of the image. The first object detection analysis is performed on the first portion of the image prior to an image undistorting process or on a portion of the image that has not gone through an image undistorting process. In one implementation, the first portion is the full image. In a second implementation, the first portion is less than the full image. A first image portion 200 (FIG. 6) is shown having a first perimeter 215 defining a first area 210. When comparing the schematic in FIG. 4 to the schematic of FIG. 5, pixel data corresponding to the first area 210 has been lost as part of the undistortion process. Accordingly, a first object detection analysis can be performed on the first image portion 200 of the image 150 prior to the image 150 being applied to the distortion correcting module 190. The first object detection analysis can be performed by the object detecting module 185.

Figure 5:
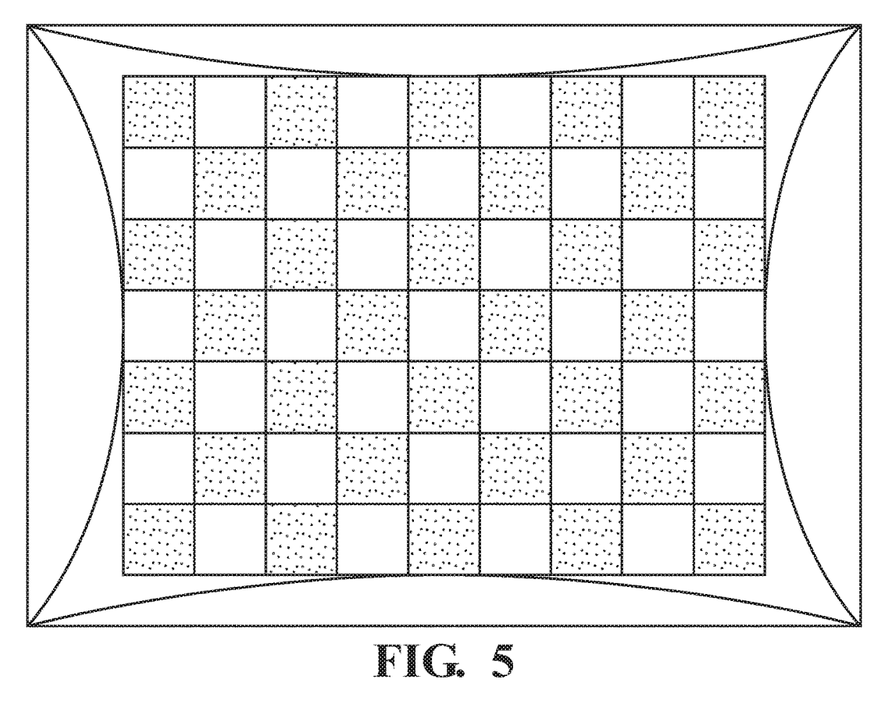
FIG. 5 shows a schematic of an undistorted image after distortion correcting.
Figure 8:
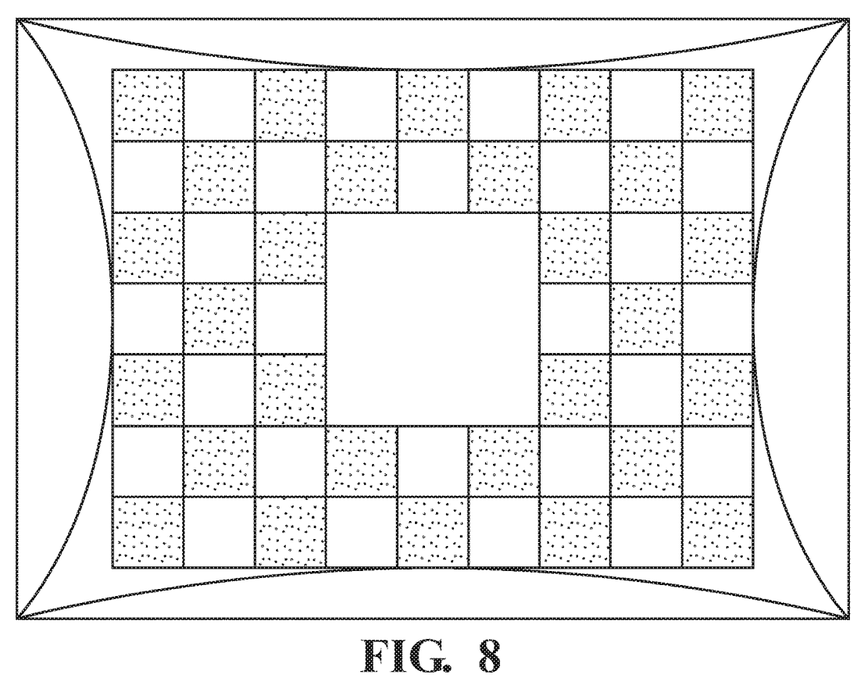
FIG. 8 shows a partial schematic of an undistorted image after distortion correcting.

At block 315, an undistortion process is performed on a portion of the image 150. The undistortion process includes correcting a distortion in the image, as discussed earlier. The portion of the image can be the full image, the result of which is schematically shown in FIG. 5. In other implementations, the portion of the image (shown as the second image portion 205 in FIG. 7) can be less than the full image, the result of which is schematically shown in FIG. 8. The portion applied to the undistortion process is referred to in this portion of the description as the second portion of the image.

One possible advantage of using the full image is that any objects on or near the second perimeter 230 may be more readily identified in one object analysis (e.g., after the undistortion process) versus another object analysis process (e.g., before the undistortion process). However, this may increase the computational cost for the method of FIG. 9. Accordingly, one possible advantage of using less than the full image (such as in FIG. 7), is that the computational cost for processing the second image portion 205 is less than the full image. The least computational cost for processing the image can occur when the first perimeter 215 is the same as the second perimeter 230. In yet another implementation, it is envisioned that the first area 210 overlaps with the second area 220, which increases the likelihood of finding an object when the first perimeter 215 is the same as the second perimeter 230, but decreases the computational cost when undistorting the full image 150. Accordingly, how the method processes the image 150 can be based on multiple factors and can be based on what is desired—greater analysis versus less computational cost. The undistortion process can be performed by the distortion correcting module 190.

An additional consideration on the first portion of the image being applied to the object detecting module 185 and the second portion of the image being applied to the distortion correcting module 190 can be the type of lens 120 being used by the camera 115. Every lens creates a distortion in the image 150. The amount of distortion can be based on the type of lens. For example, the focal distance of the lens 120 versus the expected location of an object can dictate how much distortion is expected. More specifically, a fisheye lens provides significant barrel distortion as shown in the figures. The first image portion 200 provided to the object detecting module 185 may be relatively small, while the second image portion 205 applied to the distortion correcting module may be relatively large.

Alternatively, a second lens may have a focal distance more closely aligned with an expected location of an object. In this situation, the amount of barrel distortion, for example, may be minimal. Accordingly, the first image portion 200 provided to the object detecting module 185 may be relatively large, while the second image portion 205 applied to the distortion correcting module 190 may be relatively small. The determination between the first image portion 200 and the second image portion 205 by the imaging system 105 can be statically set by the manufacturer based on known information about the camera 115, particularly the lens 120. The image partitioning module 195 performs the partitioning of the image between the first image portion 200 and the second image portion 205. The process can perform this action at different locations within FIG. 9. For example, block 320 is shown between block 300 and 305.

At block 325, a second object detection analysis is performed on a third portion of the image. The third image portion of the image 150 is typically the same as the second image portion (e.g., the second image portion 205 in FIG. 7). However, the third portion of the image can be less than the second portion of the image. For example, the undistortion process may require some pixel information outside of the third portion (e.g., near but internal to the second perimeter 230) in order to fully perform the undistortion process on the third portion. The second object detection analysis is performed on a portion of the image (e.g., the portion shown in FIG. 8) after the undistortion process has been performed on that portion of the image. The second object detection analysis can be performed by the object detecting module 185.

At block 330, the result of the first object detection analysis is combined with the result of the second object detection analysis. It should be understood that the combination can occur temporally as shown in FIG. 9 or concurrently with one or more of the prior steps of the process in FIG. 9. The result aggregating module 235 performs the function of block 330.

At block 335, the method can end. The method of FIG. 9 can provide sensor data to the processor 250 for vehicle operation as discussed above with FIG. 2. The method in FIG. 9 can be continually called upon, particularly as the vehicle moves. Of course many other possible actions that are not disclosed herein can be performed while the vehicle 100 moves.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the drawings, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may be executed entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An imaging system for processing an image captured with a camera, the imaging system comprising:
   a processor; and
   a memory communicably coupled to the processor and storing:
      an object detecting module including instructions that when executed by the processor cause the processor to perform object detecting on a first portion of the image including an optical axis of the image and perform object detecting on a second portion of the image, the first portion of the image and the second portion of the image being different; and
      a distortion correcting module including instructions that when executed by the processor cause the processor to perform an undistortion process on the second portion of the image but not on the first portion of the image, the undistortion process occurring after object detecting on the first portion of the image and before object detecting on the second portion of the image.

2. The system of claim 1, wherein the memory further stores:
   an image partitioning module including instructions that when executed by the processor cause the processor to partition the image into the first portion of the image and the second portion of the image.

3. The system of claim 2, wherein the second portion does not include the first portion.

4. The system of claim 3, wherein the distortion correcting module further includes instructions to undistort only the second portion of the image.

5. The system of claim 1, wherein the memory further stores:
   a result aggregating module including instructions that when executed by the processor cause the processor to aggregate results of the object detecting module.

6. The system of claim 5, wherein the imaging system is installed in a vehicle, the system further comprising:
   a second processor; and
   a second memory communicably coupled to the second processor and storing:
      a signal outputting module including instructions that when executed by the second processor cause the second processor to output a signal for controlling an aspect of the vehicle based on the aggregated results.

7. The system of claim 6, further comprising a vehicle system, and wherein the signal controls the vehicle system based on the aggregated results.

8. A method of processing an image, the method comprising:
   acquiring the image having a distortion;
   performing a first object detection analysis on a first portion of the image including an optical axis of the image;
   performing an undistortion process on the image;
   performing a second object detection analysis on a second portion of the image after performing the first object detection analysis, the second portion being different than the first portion; and
   combining a first result of the first object detection analysis with a second result of the second object detection analysis.

9. The method of claim 8, wherein acquiring the image includes capturing the image with a camera, storing the image in memory, and obtaining the image from the memory.

10. The method of claim 9, wherein an apparatus includes the camera and the apparatus is at least one of a vehicle and a robotic apparatus.

11. The method of claim 8, wherein the distortion is one of a barrel distortion, a pincushion distortion, and a complex distortion.

12. The method of claim 8, wherein the second portion does not include the first portion.

13. The method of claim 12, wherein the undistortion process includes undistorting the second portion of the image but not undistorting the first portion of the image.

14. The method of claim 8, wherein the undistortion process includes undistorting only the second portion of the image and the second portion of the image is a portion less than the image.

15. A non-transitory computer-readable medium for processing an image, the non-transitory computer-readable medium storing instructions that when executed by a processor cause the processor to:
acquire an image having a distortion;
perform a first object detection analysis on a first portion of the image including an optical axis of the image;
perform an undistortion process on the image;
perform a second object detection analysis on a second portion of the image after performing the first object detection analysis, the second portion being different than the first portion; and
combine a first result of the first object detection analysis with a second result of the second object detection analysis.

16. The non-transitory computer-readable medium of claim 15, wherein the instructions to acquire the image includes instructions to capture the image with a camera, store the image in memory, and obtain the image from the memory.

17. The non-transitory computer-readable medium of claim 15, wherein the distortion is one of a barrel distortion, a pincushion distortion, and a complex distortion.

18. The non-transitory computer-readable medium of claim 15, wherein the second portion does not include the first portion.

19. The non-transitory computer-readable medium of claim 15, wherein the non-transitory computer-readable medium further stores instructions that when executed by the processor cause the processor to:
partition the image into the first portion of the image and the second portion of the image.

20. The non-transitory computer-readable medium of claim 19, wherein the undistortion process includes instructions to perform the undistortion process on the second portion of the image but not on the first portion of the image.

21. The system of claim 1, wherein a determination of proportion between the first image portion and the second image portion is statically set based on known information about the camera.

* * * * *